US006081306A

United States Patent [19]

Nagano

[11] Patent Number: 6,081,306

[45] Date of Patent: Jun. 27, 2000

[54] MANUFACTURING METHOD OF PANEL DISPLAY AND ITS APPARATUS

[75] Inventor: Shinichiro Nagano, Tokyo, Japan

[73] Assignee: Mitsubishi Denki Kabushiki Kaisha, Tokyo, Japan

[21] Appl. No.: 09/044,870

[22] Filed: Mar. 20, 1998

[30] Foreign Application Priority Data

Mar. 26, 1997 [JP] Japan .................................... 9-073257

[51] Int. Cl.[7] ......................... G02F 1/133; G02F 1/1339; H01J 17/049; G09G 3/028

[52] U.S. Cl. ............................ 349/32; 349/153; 349/190; 313/582; 345/60

[58] Field of Search .................................... 349/190, 153, 349/32; 313/582, 583, 584, 585; 345/60

[56] References Cited

U.S. PATENT DOCUMENTS

| | | | |
|---|---|---|---|
| 5,207,607 | 5/1993 | Nagano et al. | 445/25 |
| 5,428,263 | 6/1995 | Nagano | 313/585 |
| 5,570,104 | 10/1996 | Hayashi | 345/60 |
| 5,742,122 | 4/1998 | Amemiya et al. | 313/582 |
| 5,759,079 | 6/1998 | Tanamachi | 445/25 |
| 5,818,168 | 10/1998 | Ushifusa et al. | 313/582 |
| 5,821,912 | 10/1998 | Miyazaki | 345/60 |
| 5,860,843 | 1/1999 | Kasahara | 445/24 |
| 5,900,100 | 5/1999 | Togawa | 156/292 |
| 5,903,381 | 5/1999 | Watanabe et al. | 359/254 |
| 5,923,389 | 6/1999 | Seki | 349/32 |
| 5,952,782 | 9/1999 | Nanto et al. | 313/584 |
| 5,967,872 | 10/1999 | Betsui et al. | 445/24 |

*Primary Examiner*—William L. Sikes
*Assistant Examiner*—Tarifur R. Chowdhury

[57] ABSTRACT

Although it is inevitable that the barrier rib fracture remains on the barrier rib from a pressure applied from opposing glass substrates surface, the present invention aims to assemble the panel display after removing the broken fragments of the barrier rib from the discharge chamber. According to the manufacturing method of the panel display for the present invention, the method includes the step of temporary aligning the two glass substrates face-to-face, the step of decompressing the barrier rib pattern area formed by the alignment of the two glass substrates by isolating the barrier rib pattern area from the normal atmospheric pressure, the step of cleaning at least one of the glass substrates on facing side by detaching one of the glass substrates after the pressure has been returned to the normal atmospheric pressure, and the step of forming the discharge chamber by pasting the two glass substrates together in the similar manner as the temporary alignment.

9 Claims, 11 Drawing Sheets

MANUFACTURING METHOD OF PANEL DISPLAY AND ITS APPARATUS

BACKGROUND OF THE INVENTION

1. Field of the Invention

The present invention relates to a manufacturing method and its apparatus for reducing an occurrence rate of picture element imperfections in a panel display.

2. Description of the Related Art

FIG. 1 illustrates a typical configuration of an electrical discharge type plasma display panel. Numbered components indicated in this figure are: sustaining discharge electrodes 1*x* and 1*y*; bus electrodes 2*x* and 2*y* supplying voltage to the sustaining discharge electrodes 1*x* and 1*y*; a dielectric layer 3 uniformly Covering the bus electrodes; a discharge cathode 4 formed with a vaporized MgO film; and a frontal glass substrate 5 loaded with the sustaining discharge electrodes, the dielectric layer and the vaporized MgO film.

Further, the numbered components are: address electrodes 6 intersecting perpendicularly with the sustaining discharge electrodes; a barrier rib 7 for separating the address electrodes 6; fluorescent bodies 8R (red), 8G (green) and 8B (blue) are formed in walls of the address electrodes 6 and the barrier rib 7; a rear glass substrate 9 loaded with the address electrodes, the barrier rib and the fluorescent bodies. A discharge chamber surrounded by the fluorescent bodies and the cathode film 4 is formed at the walls of the address electrodes 6 and the barrier ribs 7, which is formed by a top part of the barrier rib 7 touching the cathode film 4, and this discharge chamber formed is filled with a mixed gas of neon and xenon (Ne—Xe gas).

Conventional manufacturing process of the plasma display panel shown in FIG. 1 is described below.

To begin with, a flow of manufacturing the frontal glass substrate 5 is performed in three steps of 1) to 3) as described below.

1) In step 1, a method of pattern formation in a thin film photolithography process, or a processing technology such as a thick filmprinting method is usedto form the sustaining discharge electrodes 1*x* and 1*y* and the bus electrodes 2*x* and 2*y* on the frontal glass substrate 5.

2) In step 2, the dielectric layer 3 is formed by spreading and sintering a thick film glass with a low-melting point.

3) In step 3, the cathode film 4 is formed by vaporizing MgO in a vacuum.

Following is a flow of manufacturing the rear glass substrate 9, performed in steps 4) to 6) as described below.

4) In step 4, the method of pattern formation in the thin film photolithography process, or the processing technology such as the thick film printing method is used to form the address electrodes 6 on the rear glass substrate 9.

5) In step 5, the barrier rib 7 is formed by spreading and sintering the glass with a low-melting point. It is necessary to have the pattern for processing the barrier rib, for examples, a method of forming a pattern directly by a thick film printing, a method of taking the pattern by sandblasting after spreading a plain layer by the thick film printing, or a method of pre-creating a resist pattern for molding to fill the gutter by the thick film printing.

6) In step 6, a paste which is a source material for the fluorescent bodies is spreaded on the rear glass substrate 9, and the fluorescent bodies 8R, 8G and 8B are formed by burning resinous binders contained in the paste.

Process of combining the frontal glass substrate 5 and the rear glass substrate 9 completed accordingly are performed in steps 7) to 10) as described below.

7) In step 7, spread a sealing glass onto at least one of the glass substrates from the frontal 5 or the rear 9, for pasting the two substrates together at the outer edge.

8) In step 8, both substrates are aligned face-to-face.

9) In step 9, the substrates are aligned and pasted at the outer edge by melting the sealing glass with heat. At the same time, an operation to join a chip pipe with the sealing glass (as required later in step 10) is performed against an exhaust vent that is penetrating through the rear glass substrate 9.

10) In step 10, the chip pipe is connected to an air exhaust pipe of an exterior apparatus, and a chamber between the substrates are evacuated through the chip pipe by heating and degassing. After the evacuation is completed, the Ne—Xe gas for discharging is filled inside this chamber through the same chip pipe. When the gas has been filled-up completely, the chip pipe is chipped-off at a point closest to the rear glass substrate 9.

On a surface of the dielectric layer 3 which is obtained by sintering of the glass with low-melting point, generally, a numerous number of minute protrusions at sub-micron to few micron level appears due to a material constituent of the dielectric layer 3 being used. In addition, when a foreign substance became trapped inside the low-melting point glass during the sintering process, this results in an appearance of protrusions in few tenth of micron level at the surface. Even if the cathode film 4 covers the dielectric layer 3, however, since the cathode film 4 is uniform in thickness, the surface protrusions of the dielectric layer 3 are left as they are.

Likewise, at a top of the barrier rib 7, the appearance of protrusions due to the material constituent of the barrier rib 7 being used and an inclusion of the foreign substance happens commonly. Because the barrier ribs 7 has a microscopic pattern which is different from the dielectric layer 3, and the height of the barrier rib 7 ranges from 100 to 200 microns which is usually smaller than its width, and such structure in general tends to break easily when subjected to a pin-point pressure.

Under such state, when the top of barrier rib 7 touches the cathode film 4 after the step 8 as illustrated in FIG. 11, there are a number of cases where the barrier rib 7 break-off due to the pin-point pressures being applied from the protrusions of dielectric layer 3 as well as the protrusions of the top part of barrier rib 7. The breaking of barrier rib 7 occurs mostly during the vacuum evacuation of step 10. That is, as the discharge chamber is being vacuum evacuated, an outside air pressure applied to the frontal glass substrate 5 and the rear glass substrate 9 will be supported by the barrier rib 7 and this will often cause the tips of barrier rib 7 to break.

FIG. 11 illustrates the state of barrier rib breakage in cross-section viewed perpendicularly from the pattern of barrier rib 7. Numbered components indicated in FIG. 11 follows: a foreign substance 21 buried inside the dielectric layer 3; a fracture 22 of barrier rib (7) resulted from receiving the pin-point pressures from the protrusions formed by the inclusion of foreign substance; and a broken fragment 23 from the barrier rib 7. The broken fragment is attaching a little bit of fluorescent body attached to the wall. Such breakage of the barrier rib will cause the dot imperfections at a time of emissive display as described in (a) and (b) of below.

(a) A function of separating the discharge chamber is lost at the fracture 22 of barrier rib, and in FIG. 11, a mutual interference become intensified on right and left sides of the fracture 22.

(b) The broken fragment 23 from the barrier rib becomes physical and electrical obstructions in the discharge chamber.

Conventionally, the manufacturing method of the panel display is performed in a manner described previously, that there is a problem of barrier rib breaking in a final stage of the product to cause the dot imperfections at the time of emissive display due to the broken remnants left behind.

In attempt to reduce the occurrence of dot imperfections, reducing the protrusions at the top of barrier rib 7 is effective. A specific method to reduce the protrusions at the top of barrier rib 7 is to polish its surface, however, finishing touch of polishing should be done in a great accuracy otherwise outside air pressure cannot evenly be distributed at the time of vacuum evacuation in step 10, therefore, a prevention of the barrier rib breakage for this reason is difficult.

What's more, even if the protrusions at the top of barrier ribs 7 are completely removed this way, an effect of preventing the barrier rib breakage is still small, since the surface protrusions are also present on the dielectric layer 3.

As means to control the surface protrusions of the dielectric layer 3, conventionally, a prevention of the inclusion of foreign substance during the processing is most effective, in addition, when the protrusions appear at its surface, the surface polishing is also effective. However, practically speaking, it is impossible to control the inclusion of foreign substance for such structure as the panel display involving large area, as well, the surface polishing of the dielectric layer 3 is equally difficult as the polishing of the barrier rib 7.

In order to solve the problem, taking that it is inevitable to prevent the breakage of barrier ribs 7, the present invention aims to reduce the occurrence of dot imperfections by adding a process to a manufacturing apparatus, which is the process to eliminate the broken fragments into the discharge chamber so that the fragments do not become obstruction in the discharge chamber.

SUMMARY OF THE INVENTION

These and other objects are accomplished by the present invention as hereinafter described in further detail.

According to one aspect of the present invention, the manufacturing method of panel display is for sealing a first glass substrate having a barrier rib and a second glass substrate having a dielectric layer to form a discharge chamber in between the first glass substrate and the second glass substrate. The manufacturing method of panel display comprises steps of:

temporary aligning the first glass substrate and the second glass substrate face-to-face, with a side of the barrier rib facing a side of the dielectric layer;

decompressing a barrier rib pattern area formed with the first and the second glass substrates under the temporary aligning from a normal atmospheric pressure;

cleaning at least one of the glass substrates on facing side after detaching the glass substrates from the temporary aligning, after returning a pressure inside the barrier rib pattern area to the normal atmospheric pressure; and sealing the discharge chamber by re-aligning and then pasting the two glass substrates in approximately the same manner as the temporary alignment.

According to an another aspect of the present invention a manufacturing apparatus of panel display is for sealing a first glass substrate having a barrier rib and a second glass substrate having a dielectric layer to form a discharge chamber in between the first glass substrate and the second glass substrate. The apparatus comprises:

an air-tight material for covering over at least one of the glass substrate under the temporary alignment, and a table for supporting the other one of the glass substrates, and for forming an air-tight space with the air-tight material.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention, and wherein.

DETAILED DESCRIPTION OF THE PREFERRED EMBODIMENTS

Figure 1:
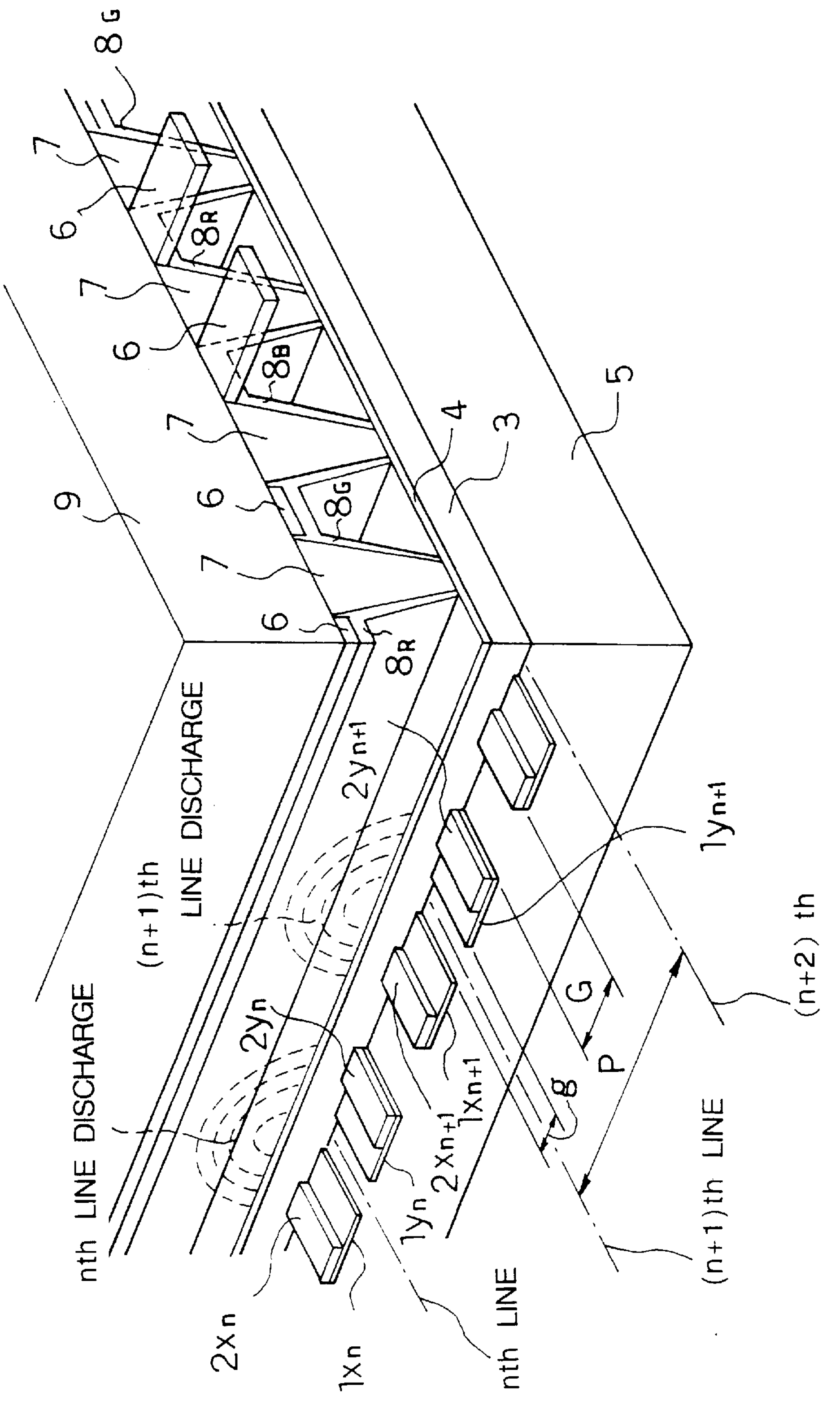
FIG. 1 is a configuration diagram of a discharge cell for a typical panel display.

Reference will now be made in detail to the present preferred embodiments of the invention, examples of which are illustrated in the accompanying drawings, wherein like reference numerals indicate like elements throughout the several views.

Embodiment 1

The manufacturing method of the panel display including a process to remove the broken fragments, and the apparatus used for such manufacturing method is described.

Figure 2:
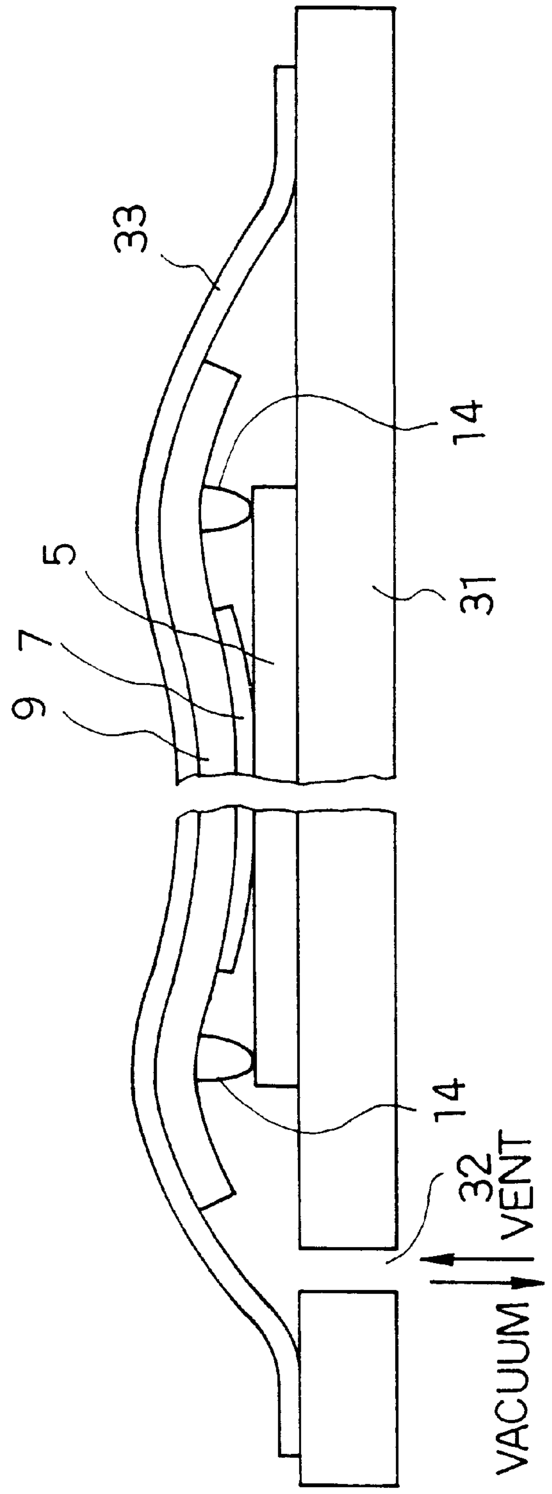
FIG. 2 illustrates an active breaking of the barrier rib for embodiment 1.

FIG. 1 illustrates an angled view of the configuration of an assembled final product. FIG. 2 illustrates a structural cross-section describing a process involved in the manufacturing method of the present embodiment. Numbered components indicated in the figures follows: nth sustaining electrodes in pairs of $\mathbf{1}x_n$ and $\mathbf{1}y_n$; n+1th sustaining electrodes in pairs of $\mathbf{1}x_{n+1}$ and $\mathbf{1}y_{n+1}$ (where n is nth number); the bus electrodes in pairs of $\mathbf{2}x_n$ and $\mathbf{2}y_n$; n+1th bus electrodes in pairs of $\mathbf{2}x_{n+1}$ and $\mathbf{2}y_{n+1}$ (where n is nth number); the dielectric layer 3, the cathode film 4, the frontal glass substrate 5 loaded with these components; address electrodes 6; the barrier ribs 7; the fluorescent bodies 8R (red), 8G (green) and 8B (blue); and the rear glass substrate 9 loaded with these components. A sealing glass 14 for pasting the frontal glass substrate 5 and the rear glass substrate 9 at the final stage of processing, for which the figure illustrates a state before melting and sealing. A table 31 is a part of the manufacturing apparatus for loading the frontal glass substrate 5 and the rear glass substrate 9. A vacuum vent 32 for decompressing is set at the table 31, which is used for vacuum evacuation and is also used to return to a normal atmospheric pressure. An air-tight sheet 33 made of a flexible material is used in decompressing a chamber between the table 31 and the frontal glass substrate 5 and the rear glass substrate 9. Depending on a circumstance, in addition to a rigid body of the table 31, an another air-tight sheet 33 made of the flexible material can be laid below the frontal glass substrate 5.

The manufacturing method of the panel display is described for the present embodiment.

An order of the manufacturing method follows below. In the embodiment, the sustaining electrode, the dielectric layer 3, and the cathode film 4 are formed on the frontal glass substrate 5, and the address electrode 6, the barrier ribs 7 and the fluorescent bodies 8 are formed on the rear glass substrate 9.

In the present embodiment, the sealing glass 14 is spread on the rear glass substrate 9 before the processing described below.

11) In step 11, the frontal glass substrate 5, with a previously mentioned components loaded on it, is placed on the table 31, with a side of the dielectric layer 3 facing up. Then, the rear glass substrate 9, with the previously mentioned components loaded on it, is placed on top of the frontal glass substrate 5, with a side of the barrier rib facing down.

12) In step 12, the frontal glass substrate 5 and the rear glass substrate 9 are aligned.

13) In step 13, a chamber is formed using the flexible sheet 33 with an air-tight quality by covering the two glass substrates and the table 31, and the chamber formed is isolated from the surrounding chamber.

14) In step 14, the isolated chamber formed that is mentioned above is decompressed through the vacuum vent 32. FIG. 2 illustrates this state. Under this state, the isolated two glass substrates are pushed aside by the outside atmospheric pressure together with the flexible sheet 33, and the tips of the barrier rib are weak so when compressed this will result in the breakage.

15) In step 15, after a pre-determined time has lapsed, the pressure inside the isolated chamber mentioned above is returned to normal through the vacuum vent 32.

16) In step 16, the flexible sheet 33 is removed and the rear glass substrate 9 is detached from the frontal glass substrate 5.

17) In step 17, the remnants mostly of the broken fragments of the barrier rib 7 that became attached to the two glass substrates 5 and 9 are removed.

Specifically, a vibration method or a vacuum suction method are effective for cleaning the rear glass substrate 9, and for cleaning the frontal glass substrate that has no fluorescent bodies, the broken fragments 23 are first of all blown away using an ultrasonic wave air blower, and the blown away fragments are removed using a vacuum suction.

Figure 3:
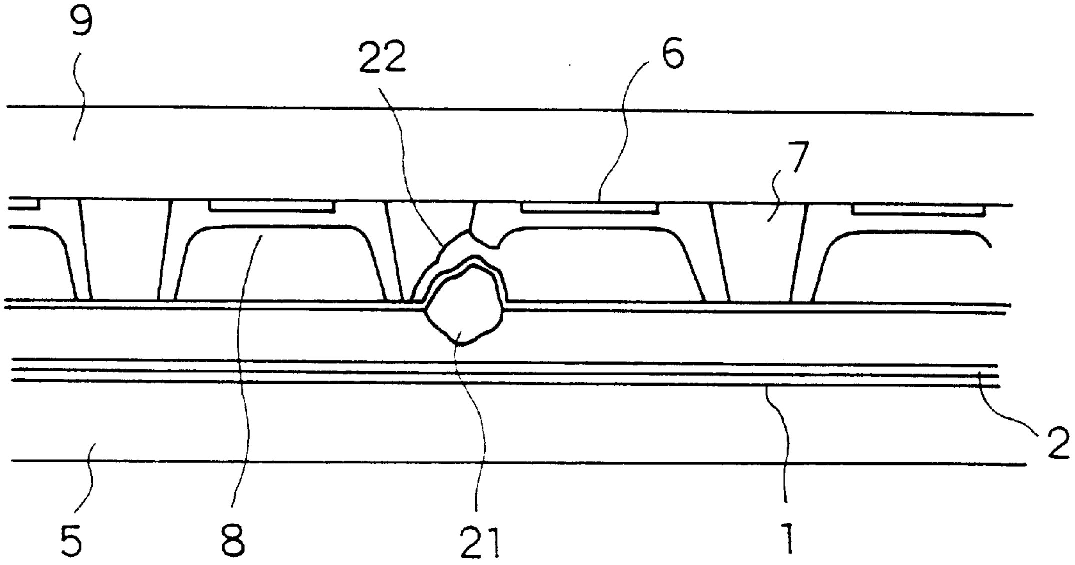
FIG. 3 illustrates a result of the barrier rib breakage of panel display after the vacuum evacuation.

18) In step 18, the two glass substrates 5 and 9 that are cleaned are re-aligned face-to-face in a similar manner as in step 12. FIG. 3 illustrates this state, and even when the foreign substances 21 happened to remain in the dielectric layer 3, a chance of further breakage occurring from embedding of the fracture 22 of the barrier rib 7 with the foreign substance becomes low.

19) In step 19, the outer edge of two glass substrates 5 and 9 are pasted together using the sealing glass 14 by melting it.

20) Lastly in step 20, the chamber formed between the two glass substrates 5 and 9 that are sealed together is vacuum evacuated, and after that the chamber is filled with the neon-xenon gas.

The broken fragments are removed accordingly, therefore, the occurrence of dot imperfections on the panel display is reduced.

In the present embodiment, the decompressing step of step 14 is only done once, however, the steps 11 to 17 can be repeated a plurality of times.

Embodiment 2

The present embodiment describes a method to uniformly apply pressure from outside to the barrier rib throughout a plane of the panel during the decompressing step.

Figure 4:
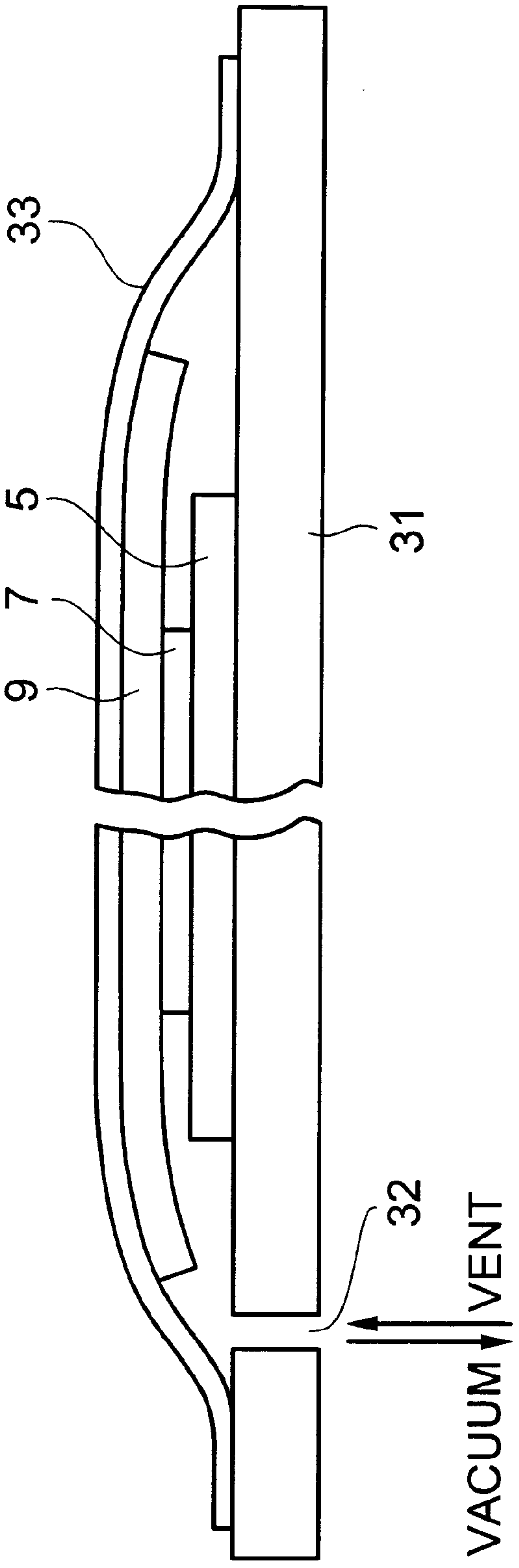
FIG. 4 illustrates the active breaking of barrier rib for embodiment 2.

In the embodiment 1 the sealing glass 14 is spread on the rear glass substrate 9 before the decompressing step, however, there is a possibility for the breakage not to occur actively. To improve from this, the decompressing step is done after the spreading of the sealing glass 14. FIG. 4 illustrates cross-section of a state after step 14 when the decompressing step is done before the spreading of the sealing glass 14. The numbered components indicated in FIG. 4 is same as the previous figure (FIG. 2). Note that same numbered components also correspond to the later figures. By doing so, the decompressing step can force a sufficient breaking of the barrier rib 7 around a panel periphery.

The step of spreading the sealing glass 14 can either be done after step 16 when the glass substrates are pulled apart, or after step 17 when the remnants are removed, or after step 18, before or after a formal alignment process of the two glass substrates and inserting the sealing material in between the two glass substrates from the side and then melting it.

Figure 5:
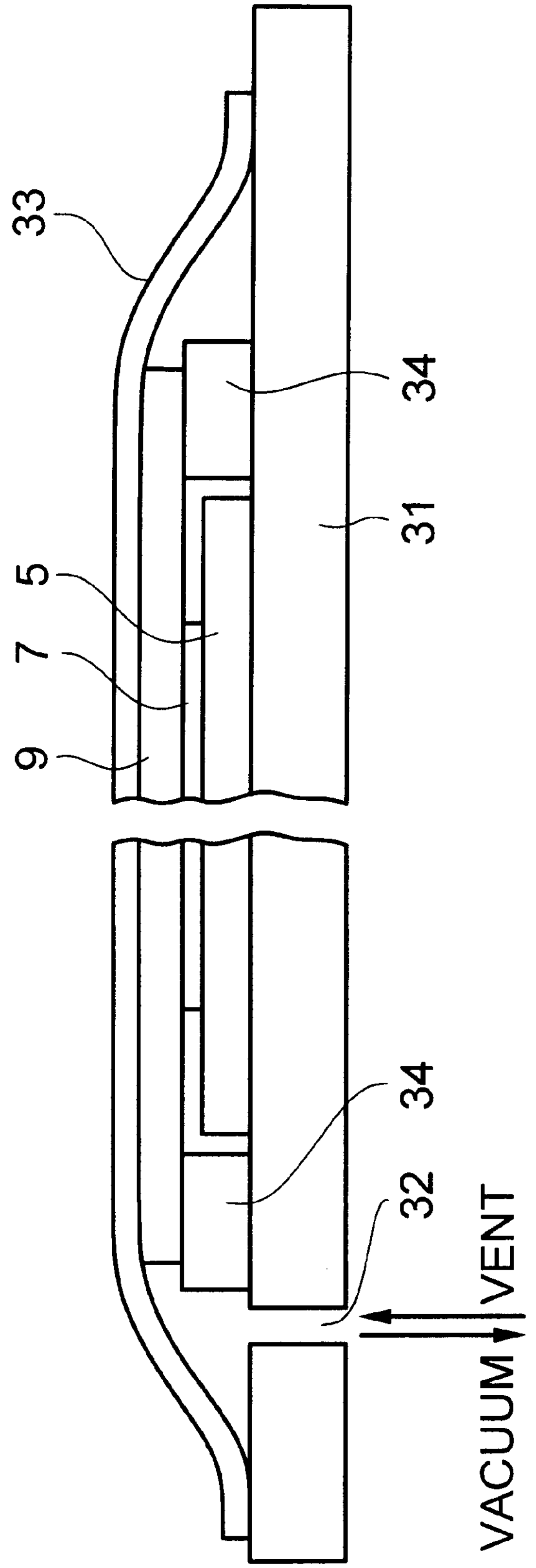
FIG. 5 illustrates an another active breaking of barrier rib for embodiment 2.

FIG. 4 is cross-section of an another manufacturing method for the present embodiment. Under the method of FIG. 4, a large amount of pressure is applied around the panel periphery at the decompressing step, and this may cause the breakage of barrier rib 7 more than it is necessary. To prevent from an excessive breakage of the barrier rib 7, as shown in FIG. 5, spacers 34 are placed around the smaller one of the glass substrates 5 or 9 after the temporary alignment of step 12. When the decompressing step 14 is performedunder this state, the barrier rib 7 will receive the uniform pressure throughout to avoid a trouble mentioned above.

Embodiment 3

The present embodiment describes a way to prevent a displacement of the alignment during the decompressing process for a proper pasting of the two glass substrates.

Under the manufacturing method described in the previous embodiments, the air-tight sheet covering whole plane of the glass substrates to create an isolated decompressing chamber was used, however, under these embodiments, the air-tight sheet 33 may possibly stretch and deform in a plane direction to cause the displacement. To prevent the stretch in the plane direction, in the present embodiment the air-tight sheet covers only the panel periphery directly, and devises an apparatus in which the decompressing is performed from the periphery of the glass substrates.

Figure 6:
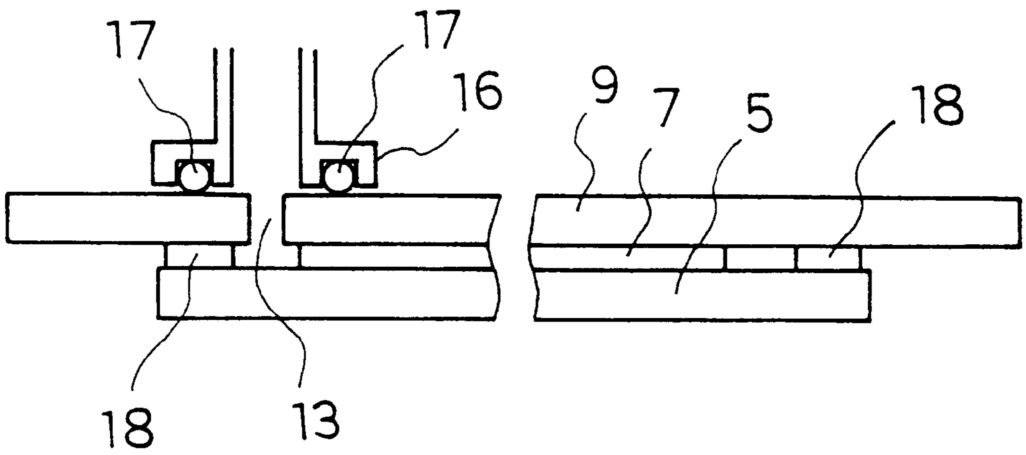
FIG. 6 illustrates the active breaking of barrier rib for embodiment 3.

FIG. 6 is structural cross-section illustrating a main part of the manufacturing apparatus for the present embodiment. A vacuum flange 16 for vacuuming a chamber formed by the two glass substrates 5 and 9 using a vent 13 which is used at final vacuuming process. An O-shaped ring 17 maintains an air-tight property of the vacuum flange 16 and the glass substrate. Spacers 18 is made of a flexible material. In the present embodiment, the sealing glass 14 is formed after the cleaning process, therefore, in preparation for decompressing step 14, the spacers 18 are placed to encompass a smaller one of the glass substrates (in FIG. 6, the frontal glass substrate 5) at the temporary aligning step, which prevents distortion of a larger one of the glass substrates (i.e. the rear glass substrate 9) to a side of the frontal glass substrate 5.

The present embodiment describes the manufacturing method of the panel display.

As described previously, the sealing glass 14 is formed after the cleaning step 17. The manufacturing step of the present embodiment is similar to the embodiment 1, except for a step described below.

During or just after the temporary aligning step, the spacers 18 that are flexible in material quality are placed to encompass the frontal glass substrate 5.

The step 13, which is the step of covering with the flexible sheet 33 of air-tight quality, is replaced with a step 23 described below.

23) In step 23, fix the vacuum flange 16 to the vacuum vent 13, with the O-shaped ring 17.

All other steps after the step 14 is same as the embodiment 1.

According to the manufacturing method of the present embodiment, since no force is applied in a horizontal direction by the air-tight sheet 31 made of flexible material, there will be no displacement in the alignment.

Embodiment 4

The present embodiment describes the manufacturing method and its apparatus that prevents the displacement of alignment during the manufacturing steps, and the manufacturing method and its apparatus with excellence that does not require to place delicate and flexible spacers.

Figures 7A, 7B, 7C:
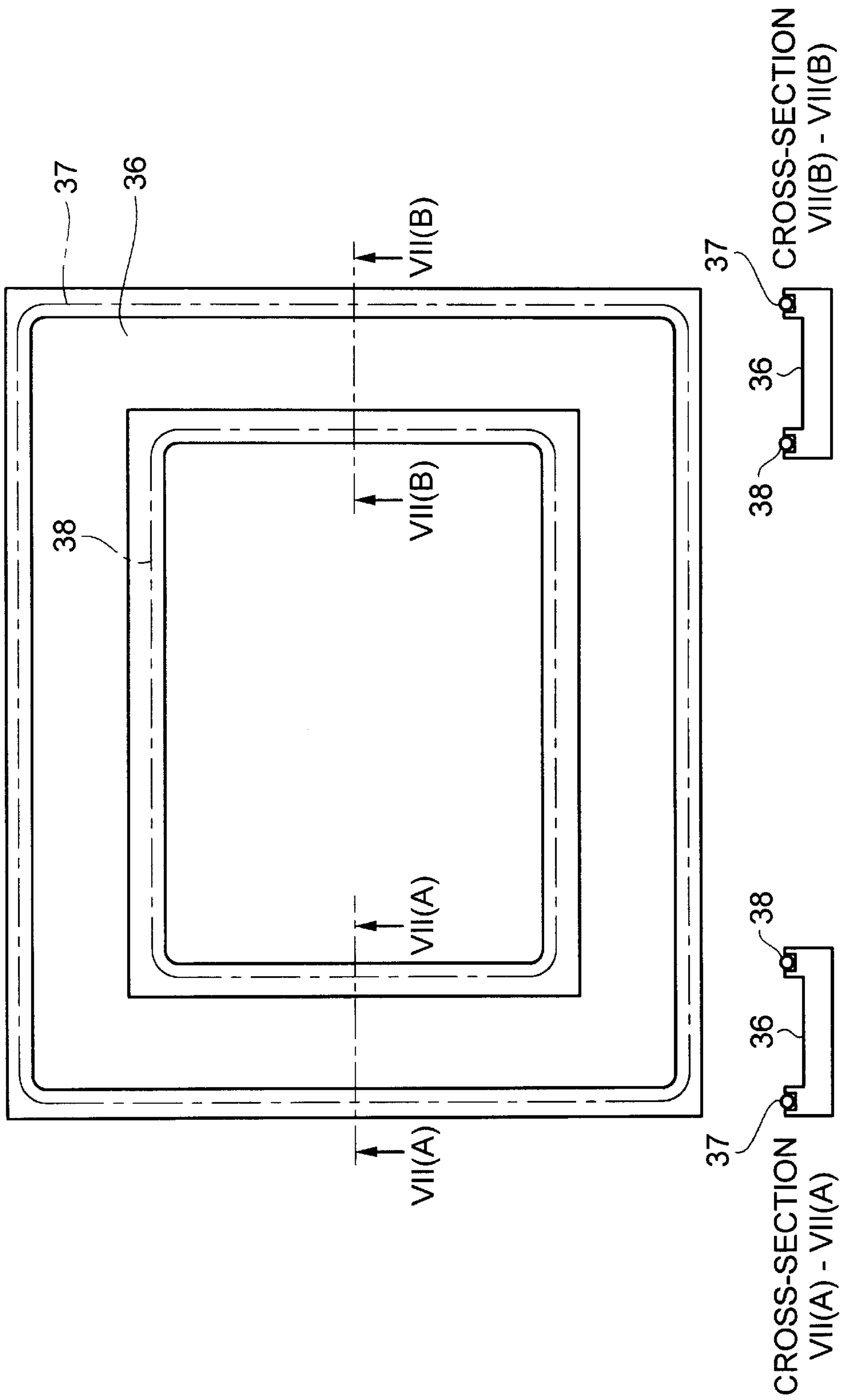
FIGS. 7A–7C are the configuration diagram of a donut-shaped upper lid for embodiment 4.
Figure 8:
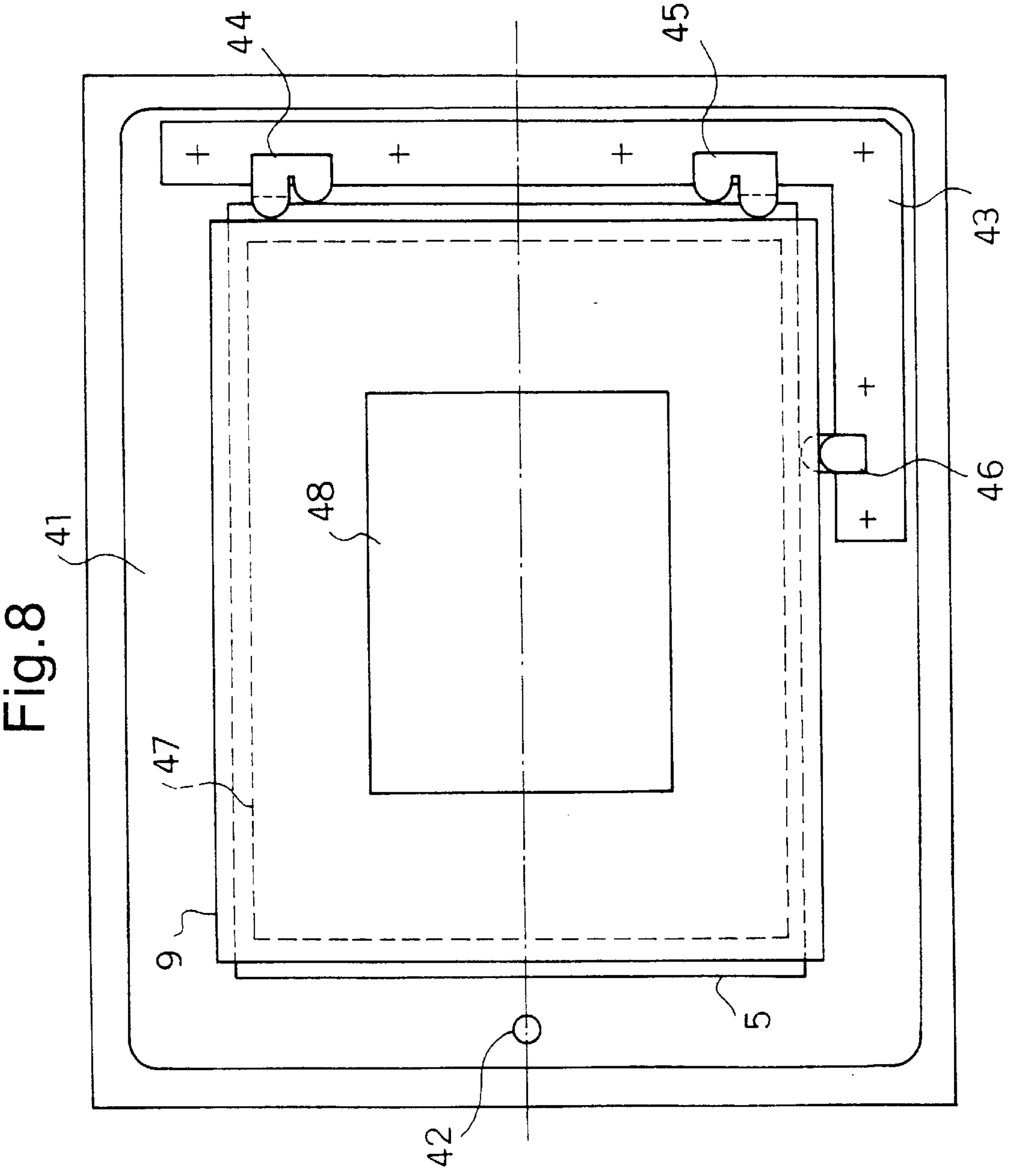
FIG. 8 illustrates the active breaking of barrier rib for embodiment 4.
Figure 9B:
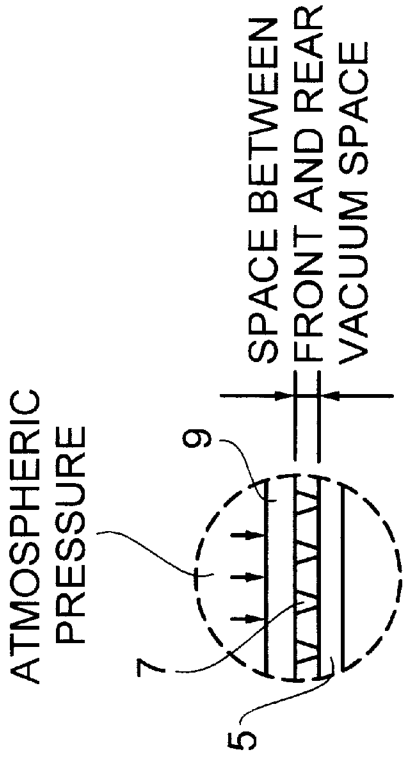
FIGS. 9A–9B illustrate a manufacturing method of embodiment 4 using cross-section of the configuration and its detail.
Figure 9A:
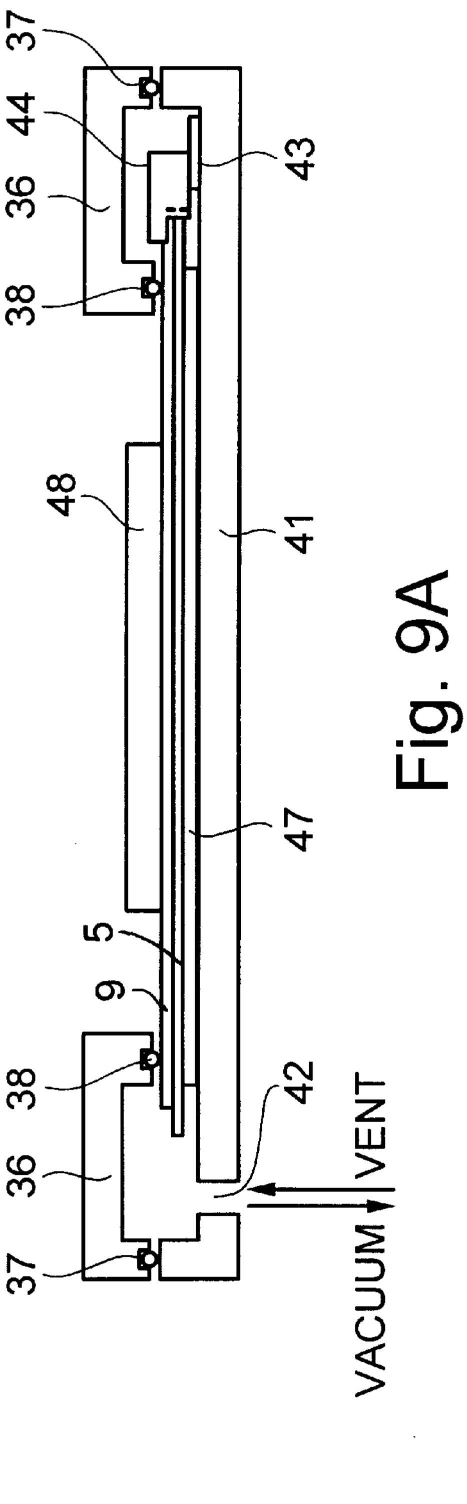

FIGS. 7A–7C illustrate a top lid used for forming an air-tight periphery of the manufacturing apparatus for the present embodiment. FIG. 8 is a plan diagram showing a table of the same manufacturing apparatus where the frontal and rear glass substrates are loaded on it. FIGS. 9A–9B illustrate cross-section of a state where the top lid of FIG. 7A is loaded onto the state illustrated in FIG. 8. Numbered components indicated in the figures follows: a donut-shaped top lid 36 for a use in air-tightening; an outer circumference of O-ring 37 for maintaining air-tightness of the donut-shaped top lid 36; an inner circumference of O-ring 38; and a box-shaped table 41 for the manufacturing apparatus of the present embodiment which is having a vacuum vent 42.

The manufacturing apparatus of the present embodiment has a plan to devise the alignment accordingly: a L-shaped base plate 43; guide pins 44, 45 and 46 used for taking alignment of the frontal glass substrate 5 and the rear glass substrate 9 at the same time; a setter 47 for adjusting heights of the guide pins 44, 45 and 46 and the two glass substrates 5 and 9; a weight 48 placed on top of the rear glass substrate 9 which stops the displacement of position of the two glass substrates.

The manufacturing method of the panel display is described for the present embodiment.

The manufacturing method and its apparatus for the embodiment 4 is same as the manufacturing method and the manufacturing apparatus for the embodiment 1, except that a step described below is included. For the embodiment 4, the sealing glass 14 is applied after the decompressing step.

Before placing the two glass substrates 5 and 9 onto the table 41 as in step 11, the guide pins 44, 45 and 46 are fixed to the box-shaped table 41 using the L-shaped based plate 43. The setter 47 for adjusting heights is also placed on the table 41.

32) In step 32, the alignment step of the present embodiment is done in a similar manner as the step 12, however, the alignment step of the present embodiment is much easier for a repeated use, because it only involves placing of the two glass substrates 5 and 9 against the guide pins 44, 45 and 46, as illustrated in FIGS. 9A–9B.

The step 32 is further described in detail. The L-shaped base plate 43 is fixed to the box-shaped table 41. The two glass substrates 5 and 9 placed on the setter 47 as the two touches a XY plane of the table 41, where X-line edge plane touches the positions of a guide pin 46, and Y-line edge plane touches the guide pins 44 and 45. In more detail, FIGS. 9A–9B illustrate the rear glass substrate 9 is touching the upper side of the guide pin 44, and the frontal glass substrate 5 is touching the lower side of the guide pin 44. On the other hand, when components of the panel display such as the sustaining electrodes 1*x* and 1*y*, the bus electrodes 2*x* and 2*y*, the address electrode 6, the barrier rib 7, and the fluorescent bodies are adequately formed to the panel periphery, there should be no problem with a displaying capacity of the panel from the absolute shifting from best aligned position to some extent, and even if the shifting occurs the re-alignment is possible.

Thus, as described in step 11, the frontal glass substrate 5 is placed on the height-adjusted setter 47, and as the frontal glass substrate 5 is being placed on the X and Y lines of the table 41, it touches the guide pins. In the present step, the rear glass substrate 9 is placed on the frontal glass substrate 5, with a side of the barrier rib 7 facing the frontal glass substrate 5. At this time, as the edge plane of the rear glass substrate 9 touches the guide pins 44 and 45, the rear glass substrate 9 is placed on the frontal glass substrate 5 at a position where the edge plane of the rear glass substrate 9 is away from the guide pin 46. After that, the edge plane of the rear glass substrate as it touches the guide pins 44 and 45, it is preferable to slide the rear glass substrate 9 on top of the frontal glass substrate 5 in a parallel direction of the barrier rib 7 pattern, towards the guide pin 46. In such the direction of movement, the top of barrier rib 7 rubs against the frontal glass substrate, no force of friction is applied in the perpendicular direction of pattern of barrier rib 7, that an unnecessary breakage of barrier rib 7 is prevented.

The isolating process of step 13 is replaced with a step described below.

33) In step 33, the donut-shaped top lid 36 for use in the air-tightening is put over the periphery of the two glass substrates through the outer O-ring 37 and the inner O-ring 38, to maintain the air-tight property of the box-shaped table 41.

The processes after the step mentioned above is similar to the embodiment 1.

According to the manufacturing method and its apparatus of the present embodiment, a fine height adjustment of the barrier rib 7 in 100 to 200 microns using the flexible ring 18 as in the previous embodiment is not necessary. That is, if the flexible ring 18 is too thin, it can cause a leak in the vacuum, and if it is too thick, it can cause a raise of the barrier rib 7 at the periphery of glass substrates where the breaking by the protrusions mentioned before may not occur. In addition, the parallel movement of the glass substrates becomes difficult by the presence of the flexible ring. On the other hand, as an indispensable item of the present embodiment, the outer O-ring 37 should be touching the outer wall of the box-shaped table 41, and at the same time, the inner O-ring 38 should be touching the rear glass substrate 9. The indispensable item can easily be accomplished within the scope of accurate processing for the box-shaped table 41 and the donut-shaped top lid 36, if sufficient flexibility and elasticity of the outer O-ring 37 and the inner O-ring 38 are provided. Accordingly, the problem with regard to the processing accuracy such as the fine thickness adjustment of the ring 18 which is required in the previous embodiment is being resolved in the present embodiment.

In the isolating process of step 33, it is important for the donut-shaped top lid 36 to sufficiently cover the periphery of the glass substrates, and a dimension of the donut-shaped top lid 36 is determined to sufficiently allow for the active breaking of the barrier rib 7. It is a well-known fact that much pressure is applied to part of the glass substrates that the inner O-ring 38 touches during the decompressing, and the pressure declines rapidly for the outer part of the glass substrates. Specifically, an ideal point for the inner O-ring 38 to touch the rear glass substrate 9 is in the effective support by the box-shaped table 41, the setter 47, the frontal glass substrate 5 and a lower barrier rib 7. Because, much portion of the outside pressure received by the donut-shaped top lid 36 during decompressing is transferred to the point of contact of the inner O-ring 38 with the rear glass substrate 9, therefore, without these support, the rear glass substrate 9 may break. However, due to such support, a several of the barrier rib 7 may end up in the region outside the inner O-ring 38. In this region, the more a distance from the inner O-ring is apart, the extent of decline in the pressure against the barrier rib 7 is rapid. Thus the region may fail to obtain a desired breakage of the barrier rib 7. Accordingly, a shape of the inner O-ring 38 is determined, knowing first of all that a sufficient pressure needed to be applied to the barrier rib 7 located within the region of effective display for the plasma display panel. Depending on circumstances, it is ideal to set adummy barrier rib pattern beforehand on the rear glass substrate 9, in the region outside the effective display, in order to support the previously mentioned pressure received from the inner O-ring 38.

An another manufacturing method is described for the present embodiment.

Figure 10:
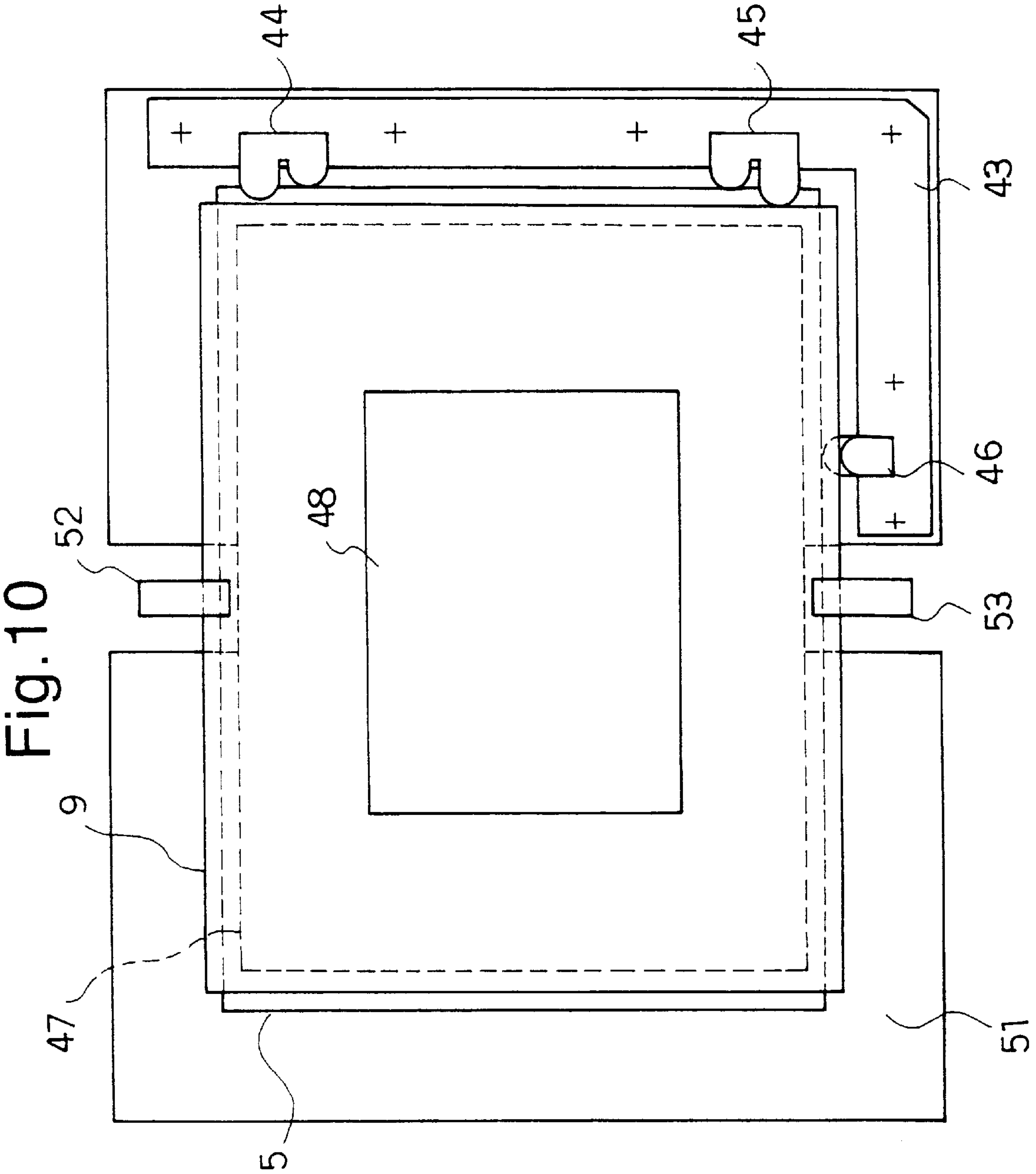
FIG. 10 illustrates an another final alignment for the embodiment 4.
Figure 11:
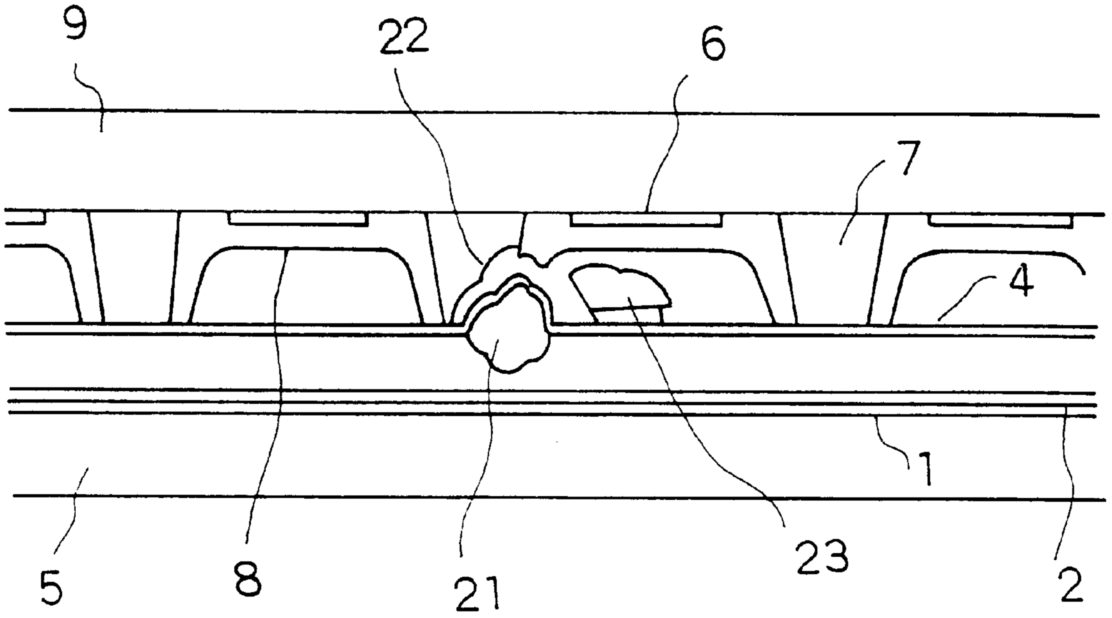
Fig.11 RELATED ART
FIG. 11 illustrates a conventional manufacturing method showing a result of the breaking of barrier rib.
Figure 9A:
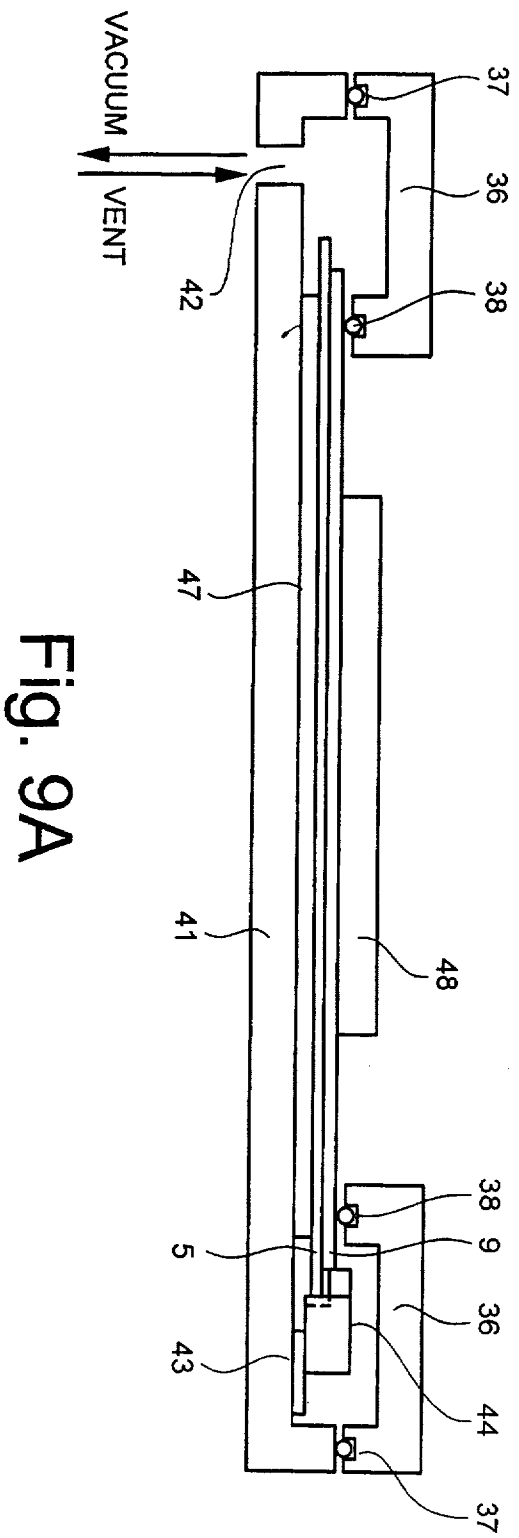
Figure 9B:
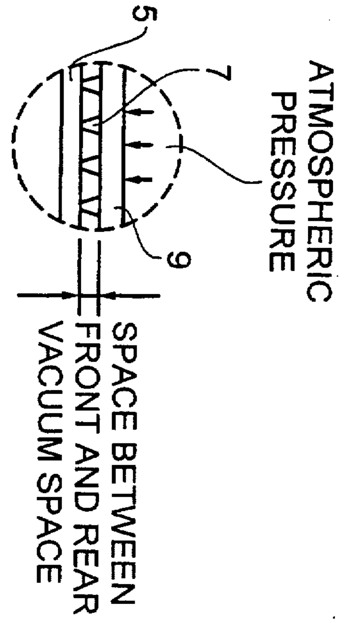

FIG. 10 illustrates the same apparatus as the one shown in FIG. 8, except for the configuration that table 51 is cut at a central portion where clips 52 and 53 for fastening the two glass substrates 5 and 9 are inserted.

According to the manufacturing method for this apparatus, the process of alignment in step 18 is adopted, and after the alignment, the two glass substrates are fastened using both of the clips 52 and 53. By doing so, the re-alignment in step 32 can easily be repeated at same manner as the step 18, and then the process continues to the pasting process of step 19. Note that a timing to form the sealing glass 14 can either be before or after the step 18.

Embodiment 5

In the previous embodiments, the fluorescent bodies 8R, 8G and 8B are formed on the rear glass substrate 9. Since the rear glass substrate 9 includes the fluorescent bodies, a cleaning means using the ultrasonic wave air blower to remove the broken fragments 23 results in a danger of taking away a normal pattern of the fluorescent bodies 8. In addition, the fluorescent bodies 8 attached on the wall may take a role of connecting the broken fragments 23, therefore, there are cases when the broken fragments 23 can not be removed by only a suction force from vacuuming.

Thus, for an effective removing of the remnants, each steps are processed according to the methods of previous embodiments before forming the fluorescent bodies on the rear glass substrate 9. That is, the fluorescent bodies are not formed that the strong cleaning means such as the ultrasonic wave air blower can be adopted. In addition, since no fluorescent bodies are present on the rear glass substrate 9 yet, the fluorescent bodies do not act as connector of the broken fragments 23. As such, after the effective removal of the broken fragments 23 of the barrier rib, for example, after the cleaning step of step 7, the fluorescent bodies are formed followed by the final alignment step, therefore reduces a number of broken fragments 23 which are causing the dot imperfections at the time of emission.

Similarly in the previous embodiment, the frontal glass substrate 5 starts off with a state where the cathode film 4 is formed on it. However, a surface of MgO, which is used in general as the cathode film in AC-type plasma display panel, is readily contaminated at the surface, and the surface has a nature of being difficult to sufficiently clean by degassing during the decompressing step when such contamination starts. When the frontal glass substrate 5 is processed with the state where the cathode film 4 is formed on it, the top of barrier rib 7 or the fluorescent bodies rub against the cathode film 4, that the cathode film 4 is readily exposed to a state of receiving the contamination mentioned above.

Accordingly, similar to the case with the fluorescent bodies, when implement the steps of manufacturing method from the previous embodiment by using the frontal glass substrate 5 before forming the cathode film 4 on it, the problem of contamination is resolved. This way, almost no new protrusions will appear when forming the cathode film 4 which leads to breakage of barrier rib 7. Therefore, even without the cathode film 4, ideal barrier rib breakage can fully be achieved under the illustrated figures of the apparatus.

After these processes are completed, using the strong means of cleaning the surface of the dielectric layer 3 such as the ultrasonic wave air blower to effectively remove the broken fragments 23, the cathode film 4 is placed on the frontal glass substrate 5, and then the final alignment step can take place.

According to description of the previous embodiments, before the final alignment process of step 18, the breaking of barrier rib are actively forced to take place in places where the breakage might occur, and after removing the broken fragments 23 of the barrier rib, and then the final alignment. A main purpose of the present invention is to remove the broken fragments of barrier rib 7 caused from protrusions in the dielectric layer 3, therefore, without considering the state of the dielectric layer 3, a fixed effect can be obtained by actively breaking the barrier rib previously using the rear glass substrate 9 solely to the places where the protrusions at the top of barrier rib 7 occur. Specifically, instead of using the frontal glass substrate 5 to the apparatus of FIGS. 5, 6 and 9, a smooth and plane glass substrate can also be used.

Accordingly, before the final alignment of pasting the two glass substrates together, the breaking of barrier rib is actively performed in places where the barrier rib breakage may likely to occur, and the broken fragments of the barrier rib are removed to reduce the number of the broken fragments of barrier rib remained inside the plasma display panel, therefore, the present invention has an effect of decreasing the dot imperfections of emissive display for the plasma display panel.

In addition, in cases when a completed plasma display panel receives a vibration or a shock from the outside, then the shock is transmitted to the barrier rib touching the frontal glass substrate. The shock may cause further breaking of the barrier rib, and the further breaking may cause an increase in the occurrence of the dot imperfections. Therefore, the present invention has an effect of decreasing a probability of the new barrier rib breakage occurring and the dot imperfections.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A manufacturing method of panel display, for sealing a first glass substrate having a barrier rib and a second glass substrate having a dielectric layer to form a discharge chamber in between the first glass substrate and the second glass substrate, the method comprising steps of:

temporary aligning the first glass substrate and the second glass substrate face-to-face, with a side of the barrier rib facing a side of the dielectric layer;

decompressing a barrier rib pattern area formed with the first and the second glass substrates under the temporary aligning from a normal atmospheric pressure;

cleaning at least one of the glass substrates on facing side after detaching the glass substrates from the temporary aligning, after returning a pressure inside the barrier rib pattern area to the normal atmospheric pressure; and sealing the discharge chamber by re-aligning and then pasting the two glass substrates in approximately the same manner as the temporary alignment.

2. The manufacturing method of panel display according to claim 1, for a step of spreading a sealing material around at a panel periphery of either one of the glass substrates for the pasting of the two glass substrates, wherein the step is inserted in between the cleaning step and the step of sealing the discharge chamber.

3. The manufacturing method of panel display according to claim 1, wherein the step of sealing the discharge chamber further includes a step of inserting the sealing material at the panel periphery of one of the glass substrates.

4. The manufacturing method of panel display according to claim 1, for the step of temporary aligning, wherein the step is provided with spacers at the periphery of either the first or the second glass substrate.

5. The manufacturing method of panel display according to claim 1, for the step of decompressing the barrier rib pattern area, wherein the step includes forming of an air-tight space surrounding the panel periphery connected to the barrier rib pattern area, and decompressing the barrier rib pattern area through the air-tight space.

6. The manufacturing method of panel display according to claim 1 further includes a step of spreading fluorescent bodies to the first glass substrate, wherein the step is inserted in between the cleaning and the sealing of the discharge chamber.

7. The manufacturing method of panel display according to claim 1 further includes a step of setting a cathode to the second glass substrate, wherein the step is inserted in between the cleaning and the sealing of the discharge chamber by pasting steps.

8. The manufacturing method of panel display according to claim 1, the temporary aligning step, the decompressing the barrier rib pattern area step, and the cleaning step are repeated a plurality of times.

9. The manufacturing method of panel display according to claim 1, for the step of temporary aligning, a flat plane with a smooth surface is replacing with one of the first and the second glass substrates.

* * * * *

UNITED STATES PATENT AND TRADEMARK OFFICE
CERTIFICATE OF CORRECTION

PATENT NO. : 6,081,306

DATED : June 27, 2000

INVENTOR(S): Shinichiro NAGANO

It is certified that error appears in the above-identified patent and that said Letters Patent is hereby corrected as shown below:

Column 1, line 39, change "filmprinting" to -- film printing --.
Column 1, line 39, change "usedto" to --used to --.
Column 6, line 56, change "performedunder" to -- performed under --.
Column 9, line 50, change "adummy" to -- a dummy --.

Signed and Sealed this

Fifteenth Day of May, 2001

Attest:

NICHOLAS P. GODICI

*Attesting Officer*

*Acting Director of the United States Patent and Trademark Office*

UNITED STATES PATENT AND TRADEMARK OFFICE

CERTIFICATE OF CORRECTION

PATENT NO. : 6,081,306
DATED : June 27, 2000
INVENTOR(S) : Shinichiro Nagano

It is certified that error appears in the above-identified patent and that said Letters Patent is hereby corrected as shown below:

Column 2,
Lines 7, 11, 13, 16 and 17, change "chip" to -- tip --.
Line 17, change "chipped-off" to -- tipped off --.
Line 48, change "tips" to -- tops --.

Column 5,
Line 50, change "tips" to -- tops --.

Column 10,
Line 22, change "step 7" to -- step 17 --.

It is respectfully submitted that the revised version of Fig. 9A on the attached sheet be substituted for the Fig. In the original drawing.

Title page, should be deleted to be replaced with the attached title page.

Drawing Sheet, consisting of Fig. 9A should be deleted to be replaced with the drawing Sheet, consisting of Fig. 9A, as shown on the attached page.

Signed and Sealed this

Eighth Day of January, 2002

*Attest:*

JAMES E. ROGAN

*Attesting Officer* *Director of the United States Patent and Trademark Office*

United States Patent [19]

Nagano

[11] Patent Number: 6,081,306

[45] Date of Patent: Jun. 27, 2000

[54] MANUFACTURING METHOD OF PANEL DISPLAY AND ITS APPARATUS

[75] Inventor: Shinichiro Nagano, Tokyo, Japan

[73] Assignee: Mitsubishi Denki Kabushiki Kaisha, Tokyo, Japan

[21] Appl. No.: 09/044,870

[22] Filed: Mar. 20, 1998

[30] Foreign Application Priority Data

Mar. 26, 1997 [JP] Japan .................................... 9-073257

[51] Int. Cl.⁷ ........................ G02F 1/133; G02F 1/1339; H01J 17/049; G09G 3/028

[52] U.S. Cl. .......................... 349/32; 349/153; 349/190; 313/582; 345/60

[58] Field of Search .................................. 349/190, 153, 349/32; 313/582, 583, 584, 585; 345/60

[56] References Cited

U.S. PATENT DOCUMENTS

| | | | |
|---|---|---|---|
| 5,207,607 | 5/1993 | Nagano et al. | 445/25 |
| 5,428,263 | 6/1995 | Nagano | 313/585 |
| 5,570,104 | 10/1996 | Hayashi | 345/60 |
| 5,742,122 | 4/1998 | Amemiya et al. | 313/582 |
| 5,759,079 | 6/1998 | Tanamachi | 445/25 |
| 5,818,168 | 10/1998 | Ushifusa et al. | 313/582 |
| 5,821,912 | 10/1998 | Miyazaki | 345/60 |
| 5,860,843 | 1/1999 | Kasahara | 445/24 |
| 5,900,100 | 5/1999 | Togawa | 156/292 |
| 5,903,381 | 5/1999 | Watanabe et al. | 359/254 |
| 5,923,389 | 6/1999 | Seki | 349/32 |
| 5,952,782 | 9/1999 | Nanto et al. | 313/584 |
| 5,967,872 | 10/1999 | Betsui et al. | 445/24 |

*Primary Examiner*—William L. Sikes
*Assistant Examiner*—Tarifur R. Chowdhury

[57] ABSTRACT

Although it is inevitable that the barrier rib fracture remains on the barrier rib from a pressure applied from opposing glass substrates surface, the present invention aims to assemble the panel display after removing the broken fragments of the barrier rib from the discharge chamber. According to the manufacturing method of the panel display for the present invention, the method includes the step of temporary aligning the two glass substrates face-to-face, the step of decompressing the barrier rib pattern area formed by the alignment of the two glass substrates by isolating the barrier rib pattern area from the normal atmospheric pressure, the step of cleaning at least one of the glass substrates on facing side by detaching one of the glass substrates after the pressure has been returned to the normal atmospheric pressure, and the step of forming the discharge chamber by pasting the two glass substrates together in the similar manner as the temporary alignment.

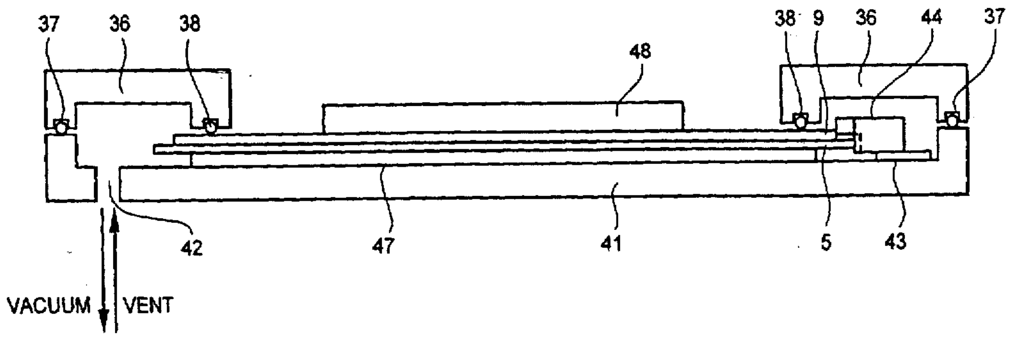

9 Claims, 11 Drawing Sheets